United States Patent [19]

Goroski

[11] 4,046,005

[45] Sept. 6, 1977

[54] THREE AXIS JOYSTICK CONTROL

[75] Inventor: Robert D. Goroski, Trumbull, Conn.

[73] Assignee: Measurement Systems, Incorporated, Norwalk, Conn.

[21] Appl. No.: 695,738

[22] Filed: June 14, 1976

[51] Int. Cl.$^2$ .............................................. G01L 5/22
[52] U.S. Cl. ................................. 73/133 R; 244/83 E
[58] Field of Search ............... 73/88.5 R, 88.5 SD, 73/141 A, 89, 133; 338/5; 244/83 E

[56] References Cited

U.S. PATENT DOCUMENTS

| 2,909,764 | 10/1959 | Chambers | 73/88.5 R |
|---|---|---|---|
| 2,943,480 | 7/1960 | Nelting | 73/88.5 R |
| 3,124,770 | 3/1964 | Ciavatta | 338/5 |
| 3,234,787 | 2/1966 | Ruge | 73/88.5 R |
| 3,454,920 | 7/1969 | Mehr | 338/5 |
| 3,513,431 | 5/1970 | Kovacs | 73/141 A |

Primary Examiner—James J. Gill
Assistant Examiner—Anthony V. Ciarlante
Attorney, Agent, or Firm—Buckles and Bramblett

[57] ABSTRACT

A device for generating isometric control signals in three axes is formed of a shaft having opposed pairs of strain gauges mounted thereon at angles to the shaft axis. One end of the shaft is fixed and the opposite free end is operable by the fingers. Electrical circuitry for combining the signals to produce useful outputs is also disclosed.

8 Claims, 5 Drawing Figures

U.S. Patent  Sept. 6, 1977  Sheet 1 of 2  4,046,005
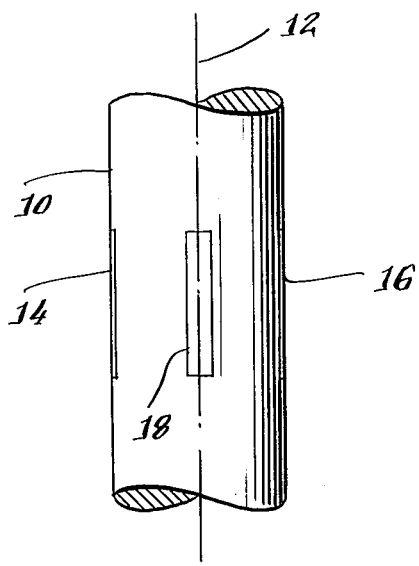
Fig. 1.
(PRIOR ART)
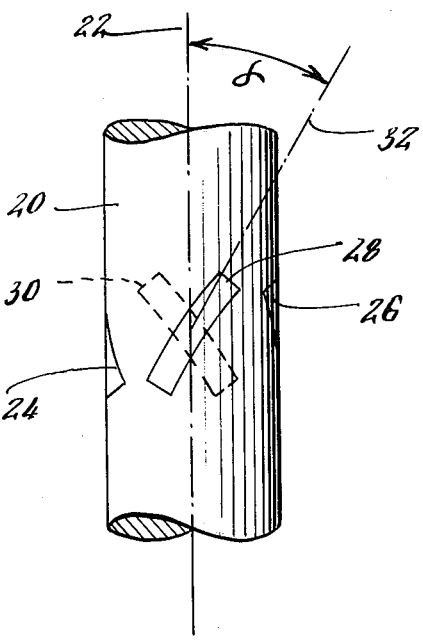
Fig. 2.
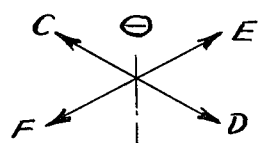
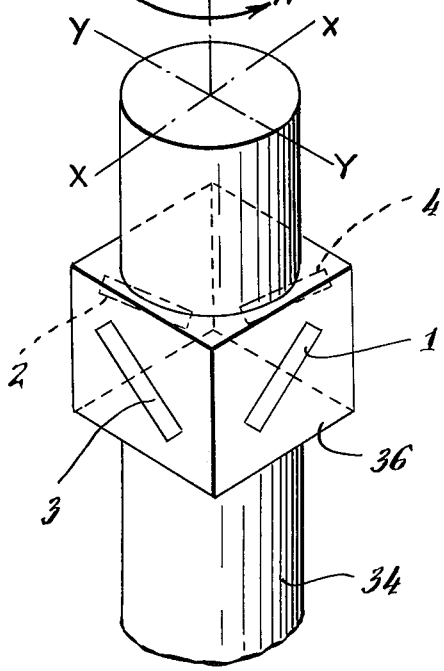
Fig. 3.
Fig. 4.
|   | FORCE |   |   |   |   |   |   |   |
|---|---|---|---|---|---|---|---|---|
| A | B | C | D | E | F |   |   |   |
| + | − | + | − | 0 | 0 | 1 | } Y | |
| + | − | − | + | 0 | 0 | 2 | | } Θ |
| − | + | 0 | 0 | + | − | 3 | } X | |
| − | + | 0 | 0 | − | + | 4 | | |
INPUTS

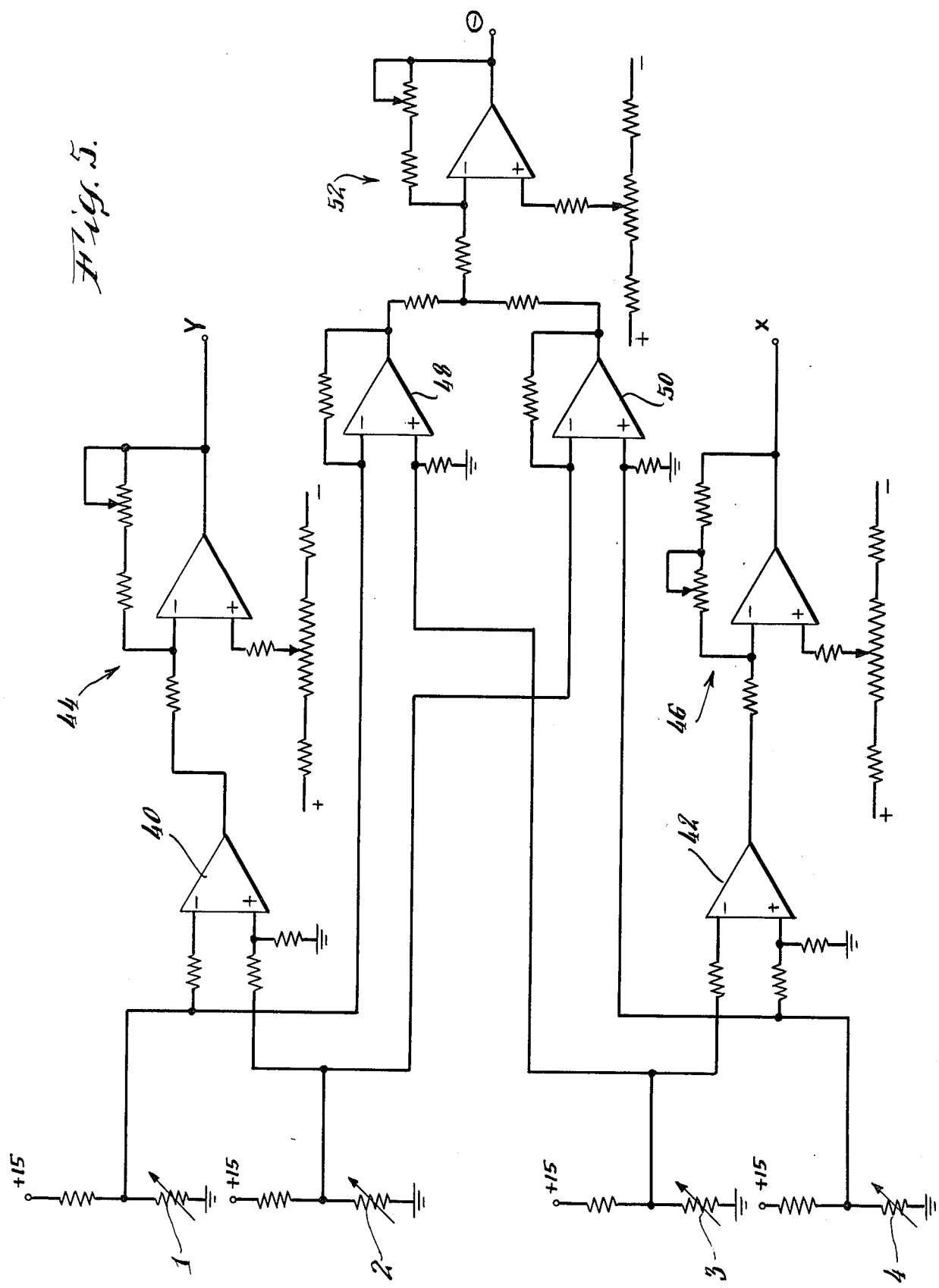

THREE AXIS JOYSTICK CONTROL

The foregoing abstract is not to be taken either as a complete exposition or as a limitation of the present invention. In order to understand the full nature and extent of the technical disclosure of this application, reference must be had to the following detailed description and the accompanying drawings as well as to the claims.

FIELD OF THE INVENTION

The invention relates to manually operated controls of the force operated or "stiff-stick" type for the operation of controlled devices. It is also applicable to mechanical controls responsive to simultaneous measurement of the bending and torque loads on a shaft. More particularly, the invention is directed to a three-axis improvement over the two axis control device disclosed by Morton Mehr in U.S. Pat. No. 3,454,920, the disclosure of which prior patent is incorporated herein by reference.

Many control applications require a three axis controller operable by a single handle or knob so that devices can be controlled about two or three axes simultaneously. Among these are radar cursors employed in air traffic control to record and display aircraft altitude, range, and bearing angle — all of which may be changing simultaneously. Another application is the positioning of microcircuit assembly tables which requires precise control in both X and Y coordinates, as well as in angle of rotation. Also, robots and manipulators, such as employed in handling radioactive materials for example, require several degrees of motion of which three may be on one knob for ease of control. Additionally, there are many other industrial and military applications, some of which may be under security classification, where an operator is required to remotely control three-axis motion.

OBJECTS OF THE INVENTION

Accordingly one of the principal objects of the invention is to provide a hand operated isometric control capable of three-axis manipulation.

Another object of the invention is to provide such a three-axis isometric control device which is small in size, light in weight, accurate, rigidly durable, and capable of manipulation by an operator's thumb and forefinger of one hand.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

BRIEF DESCRIPTION OF DRAWINGS

For a fuller understanding of the nature and objects of the invention, reference should be had to the following detailed description taken in connection with the accompanying drawings, in which:

FIG. 1 is an illustration of a prior art form of construction;

FIG. 2 is an illustration of construction according to a preferred embodiment of the present invention;

FIG. 3 is an illustrative embodiment useful in understanding the operation of the invention;

FIG. 4 is a "truth table" showing how the output signals of the opposed pairs of strain gauges in FIG. 3 are combined to produce the combined three-axis control signals; and, FIG. 5 is a circuit diagram of signal combining means for producing the desired three-axis control signals from a device according to the invention.

DESCRIPTION OF THE PREFERRED EMBODIMENT

There is illustrated in FIG. 1, for purposes for comparison, a stiff-stick control constructed in accordance with the prior art. The control comprises a rod 10 having a central longitudinal axis 12. Mounted upon the rod are four elongated strain gauges of which three are shown. The strain gauges are mounted in pairs, the two gauges of each pair being on diametrically opposite sides of the rod 10 and the pairs being disposed perpendicularly to each other. Thus, strain gauges 14 and 16 form one pair and strain gauge 18, with its unseen counterpart on the opposite side of the rod 10, form a second pair. It is important to note that the longitudinal axes of the strain gauges are parallel with the axis 12 of the rod 10. Any sideward force applied against the rod 10 cause tension or compression of the strain gauge pairs which may be said to lie upon the X and Y axes of a cross section through the rod 10. The resultant electrical signals are analyzed in accordance with the prior art to obtain a resultant indicative of the strength and direction of the applied force.

The prior art stiff-stick control described above is extremely useful and finds wide application. However, there are certain circumstances in which a third control axis would be desirable as previously explained. A control for accomplishing this objective is illustrated in FIG. 2. It is similar in many respects to that of FIG. 1 in that it includes a rod 20 having a longitudinal axis 22 and two pairs of diametrically mounted strain gauges 24, 26, 28, 30. However, the longitudinal axes of these strain gauges are not aligned with the longitudinal axis of the control rod but are, rather, disposed at angles thereto. For example, axis 32 of strain gauge 28 makes an angle $\alpha$ with the axis 22 of the rod 20. A somewhat similar arrangement is employed in the prior art for measuring torque along.

In order to simplify the showing and the explanation, the control rod of the invention is redrawn in FIG. 3 as a cylindrical rod 34 having a rectangular mid-portion 36 providing four flat surfaces upon which strain gauges 1–4 are mounted. Shown in FIG. 3 are the longitudinal (or rotational) axis $\theta$ of rod 34 and transverse X and Y axes. As will be seen from the drawing, strain gauges 1 and 2 form a pair lying along the Y axis while strain gauges 3 and 4 form a similar pair lying along the X axis. As previously explained, the longitudinal axes of the strain gauges are angled relative to the longitudinal axis 38 of the rod. The slopes of the strain gauges of each pair are in the same direction, but the slopes of the pairs are reversed. This will be apparent from FIG. 3 wherein it will be seen that the slopes of gauges 1 and 2 are the same but are reversed with respect to the slopes of gauges 3 and 4. When so disposed, the response of the strain gauges to transverse forces, as illustrated by the arrows C-F in FIG. 3, will be the same as in a conventional control. For example, the force E will act along the X axis to place gauge 3 under tension and gauge 4 under compression. The relative strain levels are reduced below those of a conventional control by an amount equal to the cosine of the angle α. (Actually, there will also be some slight strains imposed on gauges 1 and 2, but in the final analysis these may be ignored.) The important distinction over the prior art lies in the result of torsion about the θ axis as shown by the arrows A and B. The application of twisting force A puts gauges 1 and 2 under tension and gauges 3 and 4 under compression. Twisting in the direction B reverses the strains.

The truth table of FIG. 4 indicates the manner in which electrical signals are produced by the strain gauges 1–4 under various forces. In this diagram, the plus (+) sign indicates tension and the minus (−) sign indicates compression. Thus, if a force A is applied about the axis θ, each of the strain gauges 1 an 2, being under tension, produces a positive (+) output signal. The strain gauges 3 and 4, being under compression, produce negative (−) output signals.

FIG. 5 illustrates the way in which the strain gauges 1–4 are connected to an electronic analysis circuit comprising a differential amplifier 40 for receiving signals from strain gauges 1 and 2 and a differential amplifier 42 for receiving signals from strain gauges 3 and 4. The output from amplifier 40 is passed through a gain and balance adjustment circuit 44 and the output from amplifier 42 is passed through a similar adjustment circuit 46. This much of the circuitry is suitable for obtaining outputs representative of motions about the X and Y axes.

In order to obtain information relative to twisting motion about the θ axis, there is provided a differential amplifier 48 which receives signals from both the strain gauges 1 and 3. Another differential amplifier 50 receives signals from the strain gauges 2 and 4. These results are summed and applied through a third gain and balance adjusting circuit 52.

As a result of the twisting force A, resulting in the previously described signals from the strain gauges, there will be no output from differential amplifier 40 inasmuch as both of strain gauges 1 and 2 are stressed in the same direction, producing similar output signals. The same may be said of differential amplifier 42 which is responsive to a pair of negative signals from strain gauges 3 and 4. The differential amplifier 48, however, receives the positive signal from strain gauge 1 and the negative signal from strain gauge 3 and, accordingly, produces a differential output signal. The same is true of the amplifier 50, which receives the positive output from strain gauge 2 and the negative output from strain gauge 4. These outputs are summed to produce an output signal representative of motion about the axis θ. A similar result is obtained if a twisting motion is applied in the direction B, although the polarities of the output signals from the strain gauges are reversed as shown in the truth table of FIG. 4.

A lateral force applied about the X and Y axes may be similarly analyzed. For example in FIG. 4, assume that a force C as shown in FIG. 3 is applied. Such a force will cause tension of the strain gauge 1, resulting in a positive signal, and compression of strain gauge 2, resulting in a negative signal. Strain gauges 3 and 4, however, will remain substantially unaffected. As a result of the different polarity signals produced by strain gauges 1 and 2, the differential amplifier 40 will have an output which will be applied through the adjusting circuit 44 to represent a force about the Y axis. However, as no input is applied to the differential amplifier 42, there will be no such output for the X axis. Similar analyses for the other forces may be made by reference to FIG. 4.

It is believed that the many advantages of this invention will now be apparent to those skilled in the art. It will alo be apparent that a number of variations and modifications may be made therein without departing from its spirit and scope. Accordingly, the foregoing description is to be construed as illustrative only, rather than limiting. This invention is limited only by the scope of the following claims.

I claim:

1. A force operated, or "stiff-stick" control device which comprises: an elongated control rod; two pairs of elongated strain gauges mounted on the surface of said control rod, the longitudinal axis of each of said strain gauges being disposed at an acute angle to the longitudinal axis of said control rod, the gauges of each pair being on diametrically opposite sides of said rod, the diameters passing through the pairs being perpendicular to one another, and the angles of slope of the gauges of each pair being in the same direction; and means for connecting each of said strain gauges to electric means to provide signals in response to both lateral and torsional flexing of said rod.

2. The device of claim 1 wherein the slopes of the gauges of one pair are opposite the slopes of the gauges of the other pair.

3. The device of claim 2 wherein the angles of slope of the gauges are equal.

4. A force operated, or "stiff-stick" control device which comprises: an elongated control rod; two pairs of elongated strain gauges mounted on the surface of said control rod, the longitudinal axis of each of said strain gauges being disposed at an angle to the longitudinal axis of said control rod, the gauges of each pair being on diametrically opposite sides of said rod, the diameters passing through the pairs being perpendicular to one another; first means responsive to the outputs of the gauges of one pair to produce a first output signal; second means responsive to the outputs of the gauges of the other pair to produce a second output signal; third means responsive to the outputs of a first gauge of each of said pairs to produce a third signal; fourth means responsive to the outputs of the second gauge of each of said pairs to produce a fourth signal; and fifth means responsive to the sum of said third and fourth signals to produce a fifth, output, signal.

5. The device of claim 4 wherein each of said first through fourth means comprises a differential amplifier.

6. The device of claim 4 wherein the angles of slope of the gauges of each pair are in the same direction.

7. The device of claim 6 wherein the slope of the gauges of one pair are opposite the slopes of the gauges of the other pair.

8. The device of claim 7 wherein the angles of slope of the gauges are equal.

* * * * *

UNITED STATES PATENT OFFICE
CERTIFICATE OF CORRECTION

Patent No. 4,046,005            Dated September 6, 1977

Inventor(s) Robert D. Goroski

It is certified that error appears in the above-identified patent and that said Letters Patent are hereby corrected as shown below:

Column 2, line 10, "for" (2nd occurrence) should be --of--; line 45, "along" should be --alone--. Column 3, line 15, "an" should be --and--; Column 4, line 10, "alo" should be --also--; line 27, after "electric" and before "means" insert --circuit--; line 58, "slope" should be --slopes--.

Signed and Sealed this

Sixth Day of December 1977

[SEAL]

Attest:

RUTH C. MASON
Attesting Officer

LUTRELLE F. PARKER
Acting Commissioner of Patents and Trademarks